(12) United States Patent
Shin

(10) Patent No.: US 12,326,999 B2
(45) Date of Patent: Jun. 10, 2025

(54) DISPLAY DEVICE

(71) Applicant: SAMSUNG DISPLAY CO., LTD., Yongin-si (KR)

(72) Inventor: Hyun Eok Shin, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/437,624

(22) Filed: Feb. 9, 2024

(65) Prior Publication Data

US 2025/0028416 A1    Jan. 23, 2025

(30) Foreign Application Priority Data

Jul. 17, 2023  (KR) .................... 10-2023-0092567

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 2203/04112* (2013.01)

(58) Field of Classification Search
CPC ............... G06F 3/0446; G06F 3/0412; G06F 2203/04112
See application file for complete search history.

(56) References Cited

U.S. PATENT DOCUMENTS 9,285,938 B2    3/2016  Zhou et al.
11,404,528 B2 *  8/2022  Jeong ................. H10K 59/121
2017/0235398 A1 *  8/2017  Choi .................. G06F 1/1688
                                                    345/173
2018/0329534 A1 * 11/2018  Hwang ............... G06F 3/0445
2018/0348899 A1 * 12/2018  Xie ....................... G06F 3/041
2020/0168671 A1 *  5/2020  Jang .................. H10K 59/131
2020/0410195 A1 * 12/2020  Kim ................. G06V 40/1306
2021/0210565 A1 *  7/2021  Lim .................. H10K 59/131
2021/0215983 A1 *  7/2021  Ouyang ............... G06F 1/1637
2021/0233474 A1 *  7/2021  Lee .................. H10K 59/131
(Continued)

FOREIGN PATENT DOCUMENTS

CN  103413524 A   11/2013
CN  203386166 U  *  1/2014  ............ G06F 3/044
(Continued)

*Primary Examiner* — William Lu
(74) *Attorney, Agent, or Firm* — F. CHAU & ASSOCIATES, LLC

(57) ABSTRACT

A display device includes an optical sensor, a display panel disposed on the optical sensor, and a touch sensing panel disposed on the display panel. The touch sensing panel includes a first sensing area corresponding to an area in which the optical sensor is disposed, and a second sensing area distinct from the first sensing area. The touch sensing panel further includes first conductive patterns extending in a first direction, and second conductive patterns extending in a second direction intersecting with the first direction. First opening areas are provided by the first conductive patterns and the second conductive patterns disposed in the first sensing area. Second opening areas are provided by the first conductive patterns and the second conductive patterns disposed in the second sensing area. A surface area of each of the first opening areas is greater than a surface area of each of the second opening areas.

18 Claims, 12 Drawing Sheets

(56) References Cited

U.S. PATENT DOCUMENTS

| | | | |
|---|---|---|---|
| 2021/0263605 A1* | 8/2021 | Kim | G06F 3/0412 |
| 2021/0391558 A1* | 12/2021 | Kim | H10K 59/8792 |
| 2021/0399059 A1* | 12/2021 | Choi | G06F 3/0446 |
| 2022/0005878 A1* | 1/2022 | Lee | G06F 3/0448 |
| 2022/0069048 A1* | 3/2022 | Bok | G09G 3/3208 |
| 2022/0069052 A1* | 3/2022 | Liu | H10K 59/121 |
| 2022/0075980 A1* | 3/2022 | Lee | H10K 59/126 |
| 2022/0113838 A1* | 4/2022 | Xu | G06F 3/0446 |
| 2022/0199698 A1* | 6/2022 | Son | H10K 59/879 |
| 2022/0261115 A1* | 8/2022 | Bok | G06F 1/1643 |
| 2022/0278139 A1* | 9/2022 | Ikeda | G09F 9/30 |
| 2023/0165119 A1 | 5/2023 | Wang | |
| 2023/0350512 A1* | 11/2023 | Jung | G06F 3/0416 |
| 2023/0393685 A1* | 12/2023 | Wei | G06F 3/0446 |

FOREIGN PATENT DOCUMENTS

| | | |
|---|---|---|
| CN | 110658952 A | 1/2020 |
| CN | 111722757 A | 9/2020 |

\* cited by examiner

DISPLAY DEVICE

CROSS-REFERENCE TO RELATED APPLICATION

The present application claims priority under 35 U.S.C. § 119 to Korean Patent Application Number 10-2023-0092567, filed on Jul. 17, 2023, the disclosure of which is incorporated by reference herein in its entirety.

TECHNICAL FIELD

Various embodiments of the present disclosure relate to a display device including an optical sensor.

DISCUSSION OF RELATED ART

Electronic devices such as smartphones, tablet PCs, digital cameras, laptop computers, navigation systems, and smart televisions that provide images to users may include display devices for displaying images.

The display devices may include various optical sensors such as an image sensor for capturing images on a front-facing surface, a proximity sensor for detecting whether a user is in close proximity to a front surface of the display device, an illuminance sensor for detecting the illuminance on the front surface of the display device, and an iris sensor for recognizing the iris of the user.

As the display devices are implemented in various electronic devices, there is an increasing demand for display devices with various designs. For example, in the case of smartphones, there is a demand for display devices that can expand a display area by eliminating a hole located on the front surface of the display device. In this case, an optical sensor that is placed in the hole on the front surface of the display device may be disposed to overlap a display panel.

SUMMARY

Various embodiments of the present disclosure are directed to a display device that may detect a touch in an area overlapping an optical sensor while securing the amount of light incident on an optical sensor.

However, objects of the present disclosure are not limited to the above-described objects, and various modifications are possible without departing from the spirit and scope of the present disclosure.

An embodiment of the present disclosure provides a display device including an optical sensor, a display panel disposed on the optical sensor, and a touch sensing panel disposed on the display panel. The touch sensing panel includes a first sensing area corresponding to an area in which the optical sensor is disposed, and a second sensing area distinct from the first sensing area. The touch sensing panel further includes a plurality of first conductive patterns disposed in the first and second sensing areas and extending in a first direction, and a plurality of second conductive patterns disposed in the first and second sensing areas and extending in a second direction intersecting with the first direction. First opening areas are provided by the first conductive patterns and the second conductive patterns that are disposed in the first sensing area. Second opening areas are provided by the first conductive patterns and the second conductive patterns that are disposed in the second sensing area. A surface area of each of the first opening areas is greater than a surface area of each of the second opening areas.

In an embodiment, the first conductive patterns are parallel to each other in the first direction, and the second conductive patterns are parallel to each other in the second direction.

In an embodiment, the first conductive patterns include 1-1-th conductive patterns disposed in the first sensing area, and 1-2-th conductive patterns disposed in the second sensing area. The second conductive patterns include 2-1-th conductive patterns disposed in the first sensing area, and 2-2-th conductive patterns disposed in the second sensing area. The first opening areas are provided in a first area where the 1-1-th conductive patterns and the 2-1-th conductive patterns intersect with each other. The second opening areas are provided in a second area where the 1-2-th conductive patterns and the 2-2-th conductive patterns intersect with each other.

In an embodiment, the 1-1-th conductive patterns and the 2-1-th conductive patterns are not parallel to each other. The 1-2-th conductive patterns and the 2-2-th conductive patterns are parallel to each other.

In an embodiment, the number of 1-2-th conductive patterns is identical to the number of the 2-1-th conductive patterns.

In an embodiment, thicknesses of the 1-1-th conductive patterns and the 2-1-th conductive patterns are less than thicknesses of the 1-2-th conductive patterns and the 2-2-th conductive patterns.

In an embodiment, the first conductive patterns and the second conductive patterns include at least one or more conductive layers and a low-reflective layer that are stacked in a third direction.

In an embodiment, the low-reflective layer includes molybdenum-titanium oxide ($MoTiO_x$). The composition ratio of titanium (Ti) in the molybdenum-titanium oxide is about 12 at % or more.

In an embodiment, the at least one or more conductive layers includes a first conductive layer, a second conductive layer, and a third conductive layer that are stacked in the third direction. The first conductive layer and the third conductive layer include titanium (Ti). The second conductive layer includes aluminum (Al).

In an embodiment, a first mesh pattern having the first opening areas is formed in the first sensing area. A second mesh pattern having the second opening areas is formed in the second sensing area. The density of the first mesh pattern is less than the density of the second mesh pattern.

In an embodiment, the display panel includes a base substrate, a pixel circuit layer, a display element layer, and an encapsulation layer that are successively disposed in a third direction. The touch sensing panel includes a first insulating layer and a second insulating layer that are disposed on the encapsulation layer. The touch sensing panel includes first contact electrodes connected to the first conductive patterns, and second contact electrodes connected to the second conductive patterns, the first and the second contact electrodes being disposed on the first insulating layer. The first conductive patterns and the second conductive patterns are disposed on the second insulating layer.

An embodiment of the present disclosure provides a display device including an optical sensor, a display panel disposed on the optical sensor, and a touch sensing panel disposed on the display panel, and including a first sensing area corresponding to an area in which the optical sensor is disposed, and a second sensing area distinct from the first sensing area. The touch sensing panel includes a plurality of conductive patterns disposed in the first sensing area and the second sensing area. A first distance between the conductive patterns adjacent to each other in the first sensing area is greater than a second distance between the conductive patterns adjacent to each other in the second sensing area.

In an embodiment, a first thickness of the conductive patterns disposed in the first sensing area is less than a second thickness of the conductive patterns disposed in the second sensing area.

In an embodiment, the first thickness is about 1.8 µm. The second thickness is about 2.5 µm.

In an embodiment, the conductive patterns include a plurality of first conductive patterns disposed in the first and second sensing areas and extending in a first direction, and a plurality of second conductive patterns disposed in the first and second sensing areas and extending in a second direction intersecting with the first direction. A third distance between the first conductive patterns disposed in the first sensing area is greater than a fourth distance between the first conductive patterns disposed in the second sensing area.

In an embodiment, a fifth distance between the second conductive patterns disposed in the first sensing area is greater than a sixth distance between the second conductive patterns disposed in the second sensing area.

In an embodiment, a first mesh pattern having first opening areas is formed by the first conductive patterns and the second conductive patterns in the first sensing area. A second mesh pattern having second opening areas is formed by the first conductive patterns and the second conductive patterns in the second sensing area. The density of the first mesh pattern is less than the density of the second mesh pattern.

In an embodiment, the conductive patterns include at least one or more conductive layers and a low-reflective layer that are stacked in a third direction.

In an embodiment, the low-reflective layer includes molybdenum-titanium oxide ($MoTiO_x$). The composition ratio of titanium (Ti) in the molybdenum-titanium oxide is about in 12 at % or more.

BRIEF DESCRIPTION OF THE DRAWINGS

The above and other features of the present disclosure will become more apparent by describing in detail embodiments thereof with reference to the accompanying drawings.

DETAILED DESCRIPTION

Figure 1:
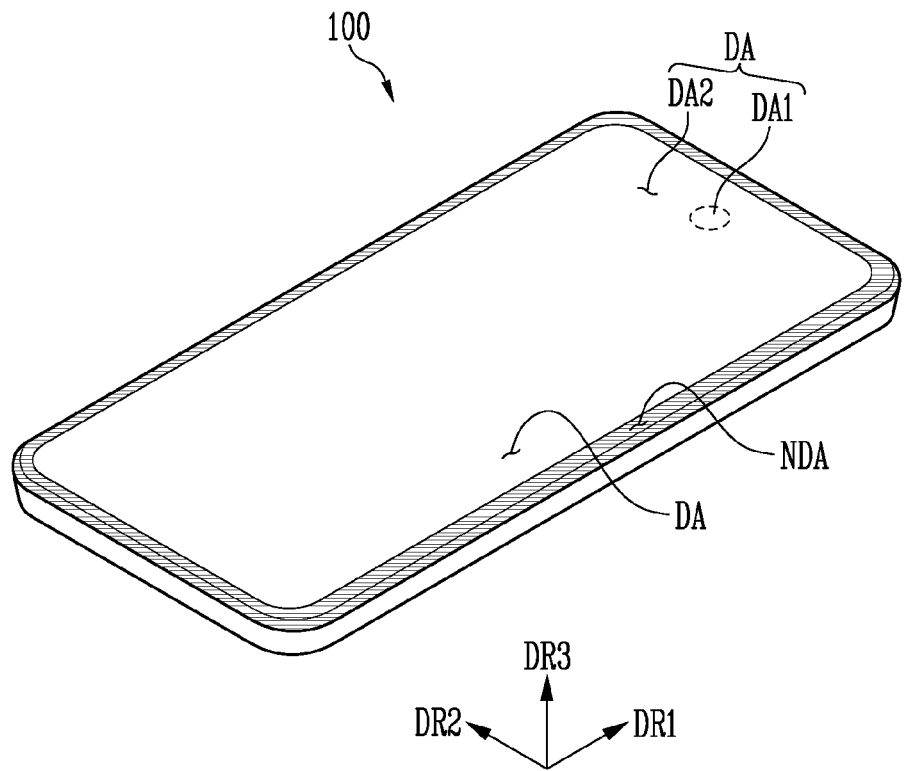
FIG. 1 is a perspective view schematically illustrating an electronic device in accordance with embodiments of the present disclosure.

Embodiments of the present disclosure will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art.

Figure 2:
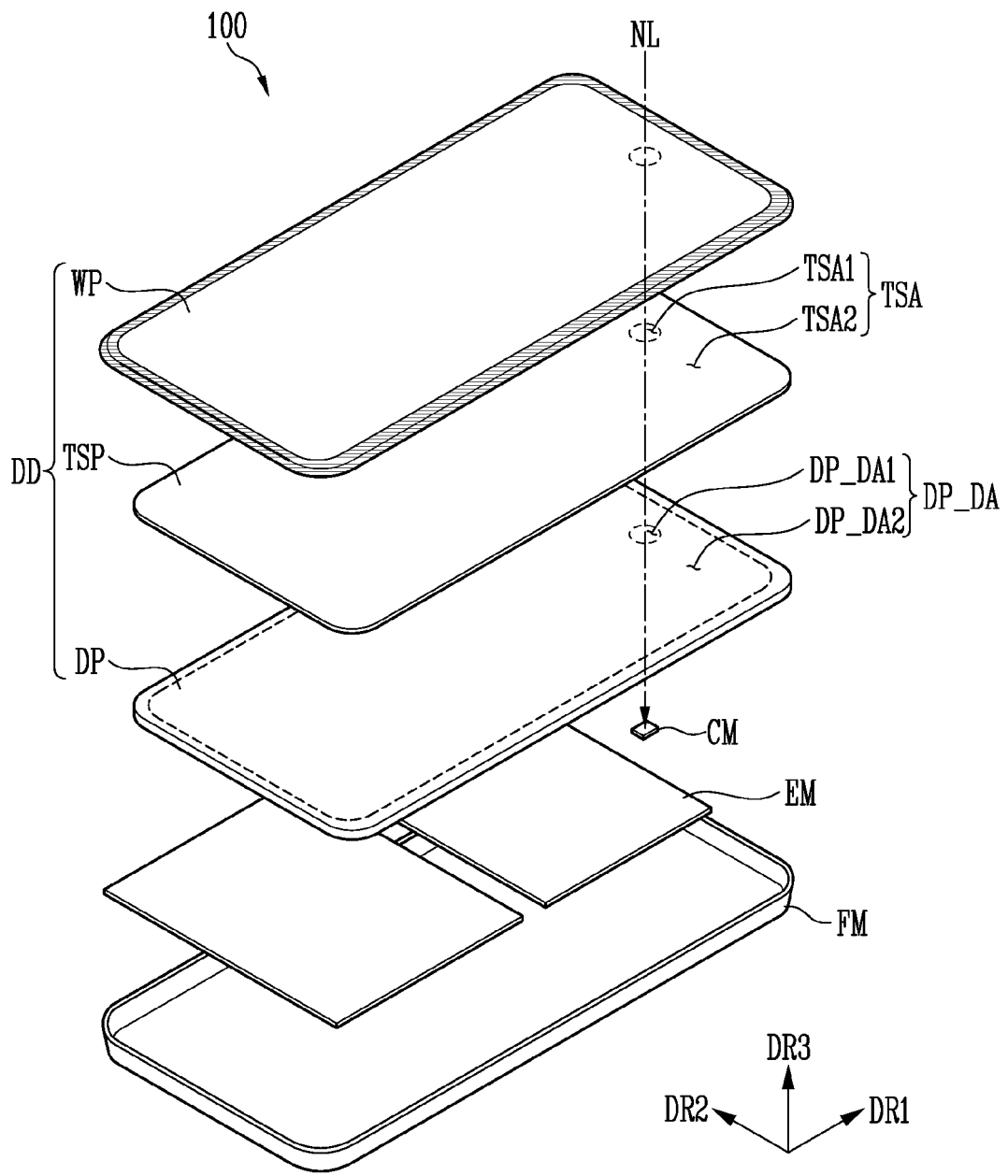
FIG. 2 is an exploded perspective view illustrating an embodiment of the electronic device of FIG. 1.

FIG. 1 is a perspective view schematically illustrating an electronic device 100 in accordance with embodiments of the present disclosure. FIG. 2 is an exploded perspective view illustrating an embodiment of the electronic device 100 of FIG. 1.

Referring to FIG. 1, the electronic device 100 may be a device configured to display a video or a still image, and may include a display device for portable electronic devices such as, for example, a mobile phone, a smartphone, a tablet personal computer (a table PC), a smartwatch, a watch phone, a mobile communication terminal, an electronic notebook, an electronic book, a portable multimedia player (PMP), a navigation device, and an ultra mobile PC (UMPC), as well as various other products such as, for example, a television, a notebook, a monitor, an advertisement panel, and an Internet-of-Things (IoT) device.

A display surface which displays an image may extend parallel to a surface defined in a first direction DR1 and a second direction DR2. A thickness direction of the electronic device 100 may be represented as a third direction DR3, which is a normal direction of the display surface.

The electronic device 100 may be formed of a rectangular panel having long sides extending in the first direction DR1, and short sides (e.g., relative to the long sides) extending the second direction DR2 intersecting the first direction DR1. Corners where the long sides extending in the first direction DR1 and the short sides extending in the second direction DR2 meet may be rounded with a certain curvature or may be formed at a right angle. The planar shape of the electronic device 100 is not limited to a rectangular shape, and may have other polygonal shapes, a circular shape, or an elliptical shape. The electronic device 100 may be formed to be planar, but is not limited thereto. For example, the electronic device 100 may include a curved surface which is formed on each of left and right side edges thereof and has a constant curvature or a varying curvature. In addition, the electronic device 100 may be formed to be flexible so that the electronic device 100 can be bent, curved, folded, or rolled.

In an embodiment, the electronic device 100 may include a display area DA and a non-display area NDA. The electronic device 100 may display an image and/or a video in the display area DA. The non-display area NDA may be adjacent to the display area DA, and may be an area in which the image and/or video is not displayed. The non-display area NDA may be an area disposed outside the display area DA to enclose the display area DA. The non-display area NDA may be disposed on side surfaces of the electronic device 100 rather than on a front surface of the electronic device 100. In an embodiment, the non-display area NDA may be omitted.

In an embodiment, the display area DA may include a first area DA1 and a second area DA2. The first area DA1 may be an area corresponding to an optical sensor CM. The first area DA1 may be an area overlapping the optical sensor CM (see FIG. 2). The first area DA1 may be an area with a lower pixel density compared to the second area DA2, thus allowing an optical signal to pass therethrough.

Although in FIGS. 1 and 2, one first area DA1 is illustrated for the sake of example, a larger number of first areas DA1 may be provided in an embodiment. Here, the optical signal may be external natural light NL (see FIG. 2), but the type of optical signal is not specifically limited.

Although in an embodiment the first area DA1 is illustrated as being spaced apart from the non-display area NDA, the first area DA1 may extend from the non-display area NDA in an embodiment.

Referring to FIG. 2, the electronic device 100 may include a display device DD, the optical sensor CM, an electronic component EM, and a frame component FM.

The display device DD may include a display panel DP, a touch sensing panel TSP, and a window panel WP.

The display panel DP may display an image and/or video. A self-emissive display panel, such as an organic light-emitting diode (OLED) display panel using an organic light-emitting diode as a light-emitting element, a subminiature light-emitting diode (micro-LED or nano-LED) display panel using a subminiature LED as a light-emitting element, and a quantum dot organic light-emitting display panel (QD OLED panel) using a quantum dot and an organic light-emitting diode, may be used as the display panel DP. In addition, a non-emissive display panel such as a liquid crystal display (LCD) panel, an electro-phoretic display (EPD) panel, or an electro-wetting display (EWD) panel may be used as the display panel DP. In a case in which the non-emissive display panel is used as the display panel DP, the display device DD may include a backlight unit configured to supply light to the display panel DP.

The display panel DP may include a display area DP_DA. The display area DP_DA may be an active area where a plurality of pixels is provided. The display area DP_DA may include a first display area DP_DA1 and a second display area DP_DA2. The first display area DP_DA1 may be an area corresponding to the first area DA1 of the electronic device 100. The second display area DP_DA2 may be an area corresponding to the second area DA2 of the electronic device 100. The display panel DP may use light emitted from a plurality of pixels disposed in the first display area DP_DA1 and the second display area DP_DA2, thus providing an image and/or video.

In an embodiment, the display panel DP may use the pixels disposed in the first display area DP_DA1, thus providing a first image (or an auxiliary image), and may use pixels disposed in the second display area DP_DA2, thus providing a second image (or a main image). The first image and the second image may correspond to portions of each single image, or each may be an independent image. The first image provided in the first display area DP_DA1 may be lower in resolution than the second image provided in the second display area DP_DA2.

The touch sensing panel TSP may be disposed on the display panel DP, and may include a touch sensing area TSA corresponding to the display area DP_DA. The touch sensing area TSA may be provided and/or formed on the overall surface of the display area DA. The touch sensing panel TSP may sense external input and/or external pressure.

In an embodiment, the touch sensing area TSA may include a first sensing area TSA1 and a second sensing area TSA2. The first sensing area TSA1 may correspond to the first area DA1 (and the first display area DP_DA1). In an embodiment, the first sensing area TSA1 may be an area overlapping the optical sensor CM. The second sensing area TSA2 may correspond to the second area DA2 (and the second display area DP_DA2). The second sensing area TSA2 may be an area distinct from the first sensing area TSA1, and in an embodiment, does not overlap the optical sensor CM. In an embodiment, the second sensing area TSA2 may enclose the first sensing area TSA1, but embodiments are not limited thereto.

The touch sensing panel TSP may include a plurality of conductive patterns disposed to correspond to the touch sensing area TSA. Some (e.g., driving electrodes) of the plurality of conductive patterns may receive touch driving signals. Remaining some (e.g., sensing electrodes) of the plurality of conductive patterns may output sensing signals representing changes in capacitance between the plurality of conductive patterns. When a part of the user's body (e.g., the finger of the user) is placed on the conductive patterns that are capacitively coupled, the capacitance between the conductive patterns may change.

In an embodiment, the window panel WP may be disposed on the touch sensing panel TSP. The window panel WP may be provided on an outer surface of the electronic device 100. The window panel WP may include a base substrate, and may further include functional layers such as, for example, an anti-reflection layer and a fingerprint prevention layer.

In an embodiment, the electronic component EM may be disposed under the display panel DP. The electronic component EM may include, for example, a wireless communication module, a video input module, an audio input module, a memory, a battery module, and an external interface module, etc. The modules may be mounted on a circuit board or may be electrically connected through a flexible circuit board.

In an embodiment, the frame component FM may be coupled to the window panel WP and receive the display panel DP, the touch sensing panel TSP, and the electronic component EM. Although one frame component FM is illustrated for the sake of example in FIG. 2, the frame component FM may include two or more components assembled with each other according to embodiments.

In an embodiment, the optical sensor CM may be disposed under the display panel DP. The optical sensor CM may include an electronic component configured to output or receive optical signals. The optical sensor CM may receive natural light NL through the first area DA1, the first sensing area TSA1, and the first display area DP_DA1 to capture an external image. The optical sensor CM may include a camera module, but is not limited thereto, and may include, for example, a proximity sensor and/or an infrared emission sensor according to embodiments.

In an embodiment, the optical sensor CM may overlap the first sensing area TSA1 and the first display area DP_DA1. The first sensing area TSA1 and the first display area DP_DA1 have relatively high light transmittance compared to other areas. In an embodiment, the light transmittance of the first sensing area TSA1 is higher than that of the second sensing area TSA2. The light transmittance of the first display area DP_DA1 may be higher than that of the second display area DP_DA2.

Figure 3:
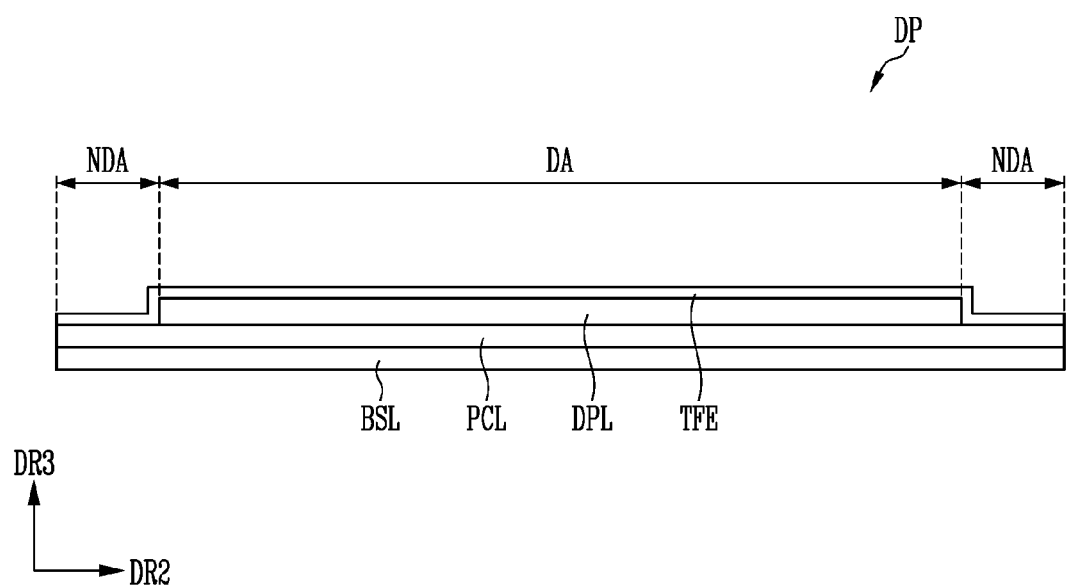
FIG. 3 is a cross-sectional view illustrating an embodiment of a display panel of FIG. 2.

FIG. 3 is a cross-sectional view illustrating an embodiment of a display panel DD of FIG. 2.

Referring to FIG. 3, the display panel DP may include a base layer BSL, a pixel circuit layer PCL, a display element layer DPL, and an encapsulation layer TFE.

The base layer BSL may include a transparent insulating material to allow light transmission. The base layer BSL may be a rigid substrate or a flexible substrate. For example, the rigid substrate may be one of a glass substrate, a quartz substrate, a glass ceramic substrate, and a crystalline glass substrate. The flexible substrate may be either a film substrate or a plastic substrate which includes a polymer organic material. For example, the flexible substrate SUB may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate.

An area of the base layer BSL may be provided as the display area DA in which a plurality of pixels is disposed, and another area of the base layer BSL may be provided as the non-display area NDA.

The pixel circuit layer PCL may be disposed on the base layer BSL, and include a plurality of transistors and signal lines connected to the transistors. For example, each transistor may have a shape in which a semiconductor pattern, a gate electrode, a source electrode, and a drain electrode are successively stacked with insulating layers interposed therebetween. The semiconductor pattern may include, for example, amorphous silicon, poly silicon, low temperature poly silicon, and an organic semiconductor, and/or an oxide semiconductor. The gate electrode, the source electrode, and the drain electrode each may include one of, for example, aluminum (Al), copper (Cu), titanium (Ti), and molybdenum (Mo). However, the present disclosure is not limited thereto. In addition, the pixel circuit layer PCL may include at least one or more insulating layers.

The display element layer DPL may be disposed on the pixel circuit layer PCL. The display element layer DPL may include a light-emitting element configured to emit light.

The light-emitting element may be, e.g., an organic light-emitting diode. However, the present disclosure is not limited thereto. In an embodiment, the light-emitting element may be an inorganic light-emitting element including an inorganic light-emitting material, or a light-emitting element that emits light by changing the wavelength of the light to be emitted using quantum dots.

The encapsulation layer TFE may be disposed on the display element layer DPL. The encapsulation layer TFE may be an encapsulation substrate or have the form of an encapsulation film having a multilayer structure. In a case in which the encapsulation layer TFE has the form of the encapsulation film, the encapsulation layer ENL may include an inorganic layer and/or an organic layer. For example, the encapsulation layer TFE may have a structure formed by successively stacking an inorganic layer, an organic layer, and an inorganic layer. The encapsulation layer TFE may prevent external air or water from permeating the display element layer DPL or the pixel circuit layer PCL.

Figure 4:
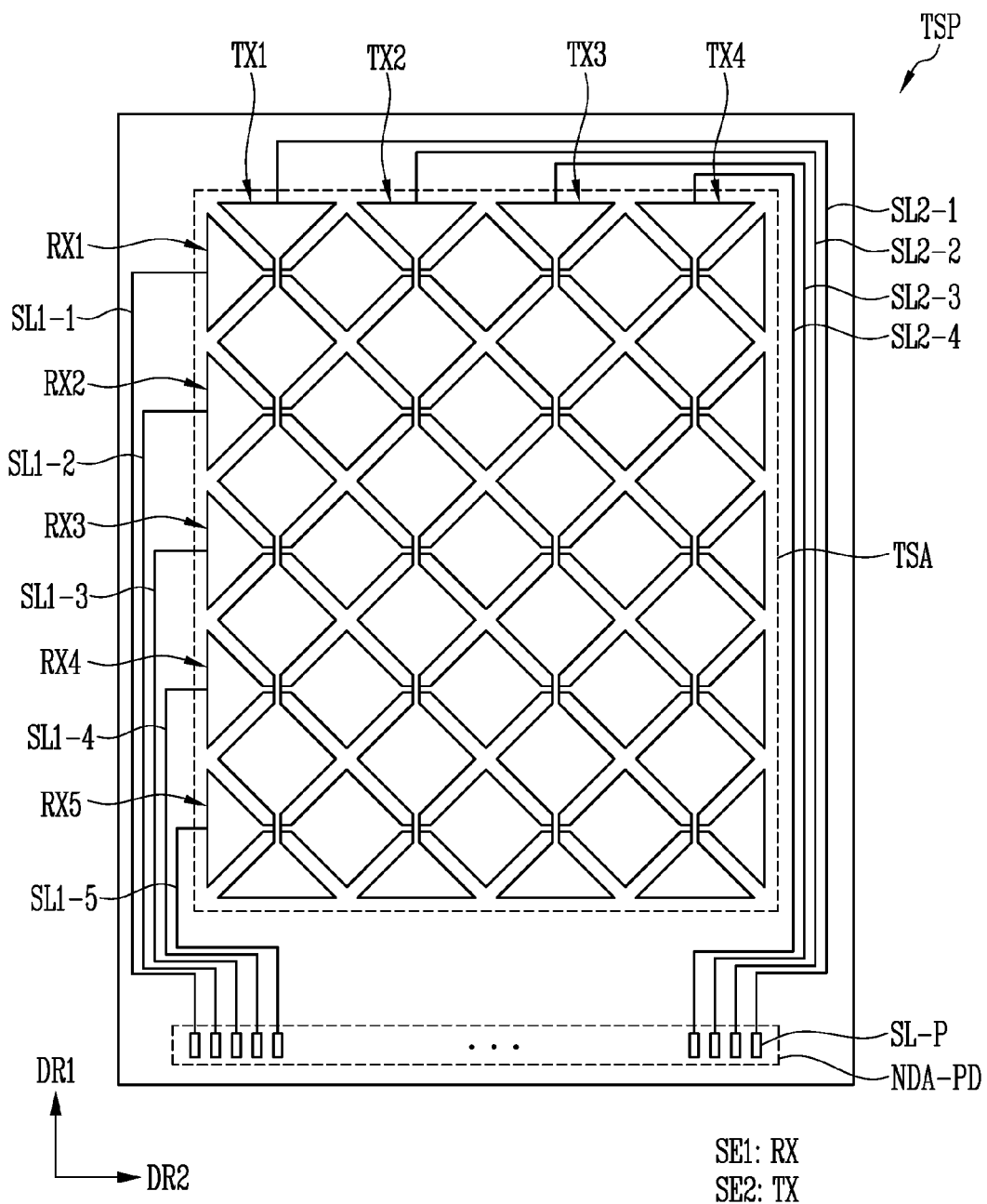
FIG. 4 is a plan view illustrating an embodiment of a touch sensing panel of FIG. 2.

FIG. 4 is a plan view illustrating an embodiment of the touch sensing panel TSP of FIG. 2.

Referring to FIG. 4, the touch sensing panel TSP may include sensing electrodes SE1 and driving electrodes SE2 that are disposed in the touch sensing area TSA.

The sensing electrodes SE1 may include first to fifth sensing electrodes RX1 to RX5. The driving electrodes SE2 may include first to fourth driving electrodes TX1 to TX4. External input may be sensed by a mutual capacitance method using changes in capacitance between the sensing electrodes SE1 and the driving electrodes SE2.

In an embodiment, the sensing electrodes SE1 and the driving electrodes SE2 may be formed of mesh patterns. The sensing electrodes SE1 and the driving electrodes SE2 may intersect with each other. The sensing electrodes SE1 may be arranged substantially parallel to each other in the first direction DR1, and may extend in the second direction DR2. The driving electrodes SE2 may be arranged substantially parallel to each other in the second direction DR2, and may extend in the first direction DR1.

In an embodiment, the touch sensing panel TSP may include first signal lines SL1-1 to SL1-5, second signal lines SL2-1 to SL2-4, and a pad component SL-P that are disposed in an area corresponding to a non-display area (e.g., the non-display area NDA in FIG. 1). In an embodiment, the first signal lines SL1-1 to SL1-5 may be respectively electrically connected to first ends of the first to fifth sensing electrodes RX1 to RX5, and the second signal lines SL2-1 to SL2-4 may be respectively electrically connected to second ends of the first to fourth driving electrodes TX1 to TX4. However, the connection between the first and second signal lines SL1-1 to SL1-5 and SL2-1 to SL2-4 and the sensing and driving electrodes SE1 and SE2 is not limited to the aforementioned example. The first and second signals SL1-1 to SL1-5 and SL2-1 to SL2-4 may be electrically connected to the pad component SL-P. The pad component SL-P may be arranged in the pad area NDA-PD. In an embodiment, the shape of the touch sensing panel TSP illustrated in FIG. 4 is provided for example, and the planar shape of the touch sensing panel TSP is not limited thereto.

Figure 5:
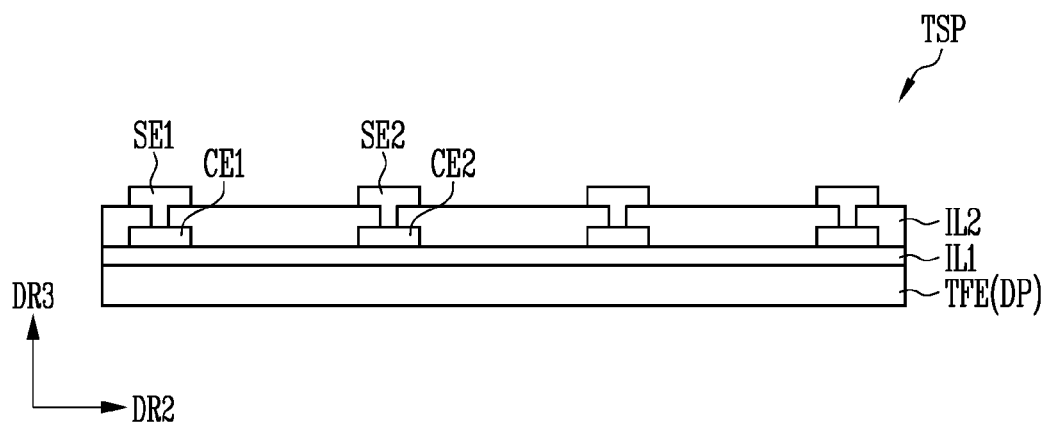
FIG. 5 is a cross-sectional view illustrating an embodiment of the touch sensing panel of FIG. 4.

FIG. 5 is a cross-sectional view illustrating an embodiment of the touch sensing panel TSP of FIG. 4.

Referring to FIG. 5, the touch sensing panel TSP may include first and second insulating layers IL1 and IL2, the sensing electrodes SE1, the driving electrodes SE2, and contact electrodes CE1 and CE2.

In an embodiment, the touch sensing panel TSP may be disposed on the encapsulation layer TFE of the display panel DP. In an embodiment, the first and second insulating layers IL1 and IL2 may be successively disposed on the encapsulation layer TFE in the third direction DR3. In an embodiment, the first insulating layer IL1 of the first and second insulating layers IL1 and IL2 may include at least one of an organic insulating material and an inorganic insulating material. For example, the first and second insulating layers IL1 and IL2 may include at least one of silicon oxide, silicon nitride, and silicon oxynitride.

In an embodiment, the contact electrodes CE1 and CE2 may be disposed on the first insulating layer IL1. The contact electrodes CE1 and CE2 may include first contact electrodes CE1 and second contact electrodes CE2. The first contact electrodes CE1 may be electrically connected to the sensing electrodes SE1. The second contact electrodes CE2 may be electrically connected to the driving electrodes SE2. The first and second contact electrodes CE1 and CE2 may be spaced apart from each other.

In an embodiment, the second insulating layer IL2 may cover the contact electrodes CE1 and CE2. The second insulating layer IL2 may include openings allowing the contact electrodes CE1 and CE2 to be exposed to the outside of the touch sensing panel TSP.

In an embodiment, the sensing electrodes SE and the driving electrodes SE2 may be disposed on the second insulating layer IL2. The sensing electrodes SE1 and the driving electrodes SE2 may be spaced apart from each other. The sensing electrodes SE1 may be electrically connected to the first contact electrodes CE1, and thus electrically connected to first signal lines (e.g., the first signal lines SL1-1 to SL1-5 in FIG. 4). The driving electrodes SE2 may be electrically connected to the second contact electrodes CE2, and thus electrically connected to second signal lines (e.g., the second signal lines SL2-1 to SL2-4 in FIG. 4).

Figure 6:
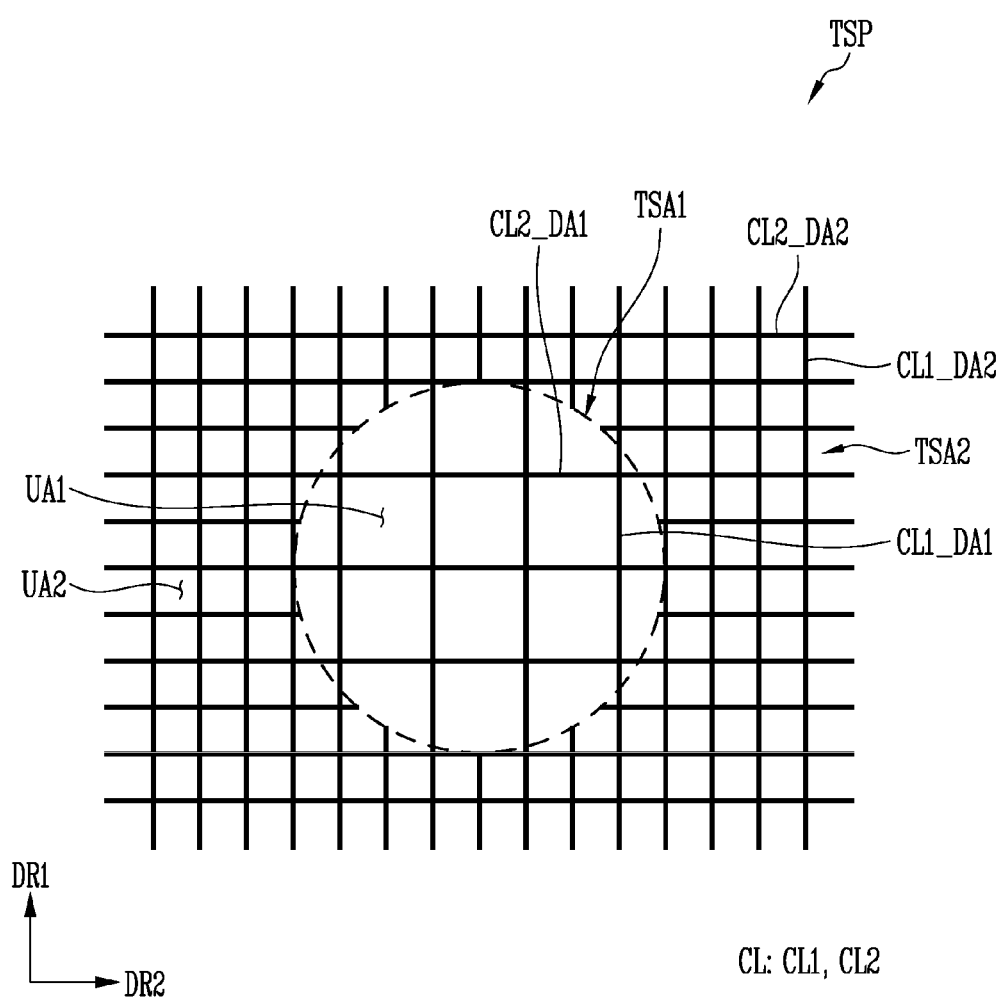
FIG. 6 is a plan view illustrating an embodiment of the touch sensing panel including a first sensing area and a second sensing area of FIG. 2.

In an embodiment, the sensing electrodes SE1 and the driving electrodes SE2 may be respectively provided and/or formed by conductive patterns (e.g., conductive patterns CL in FIG. 6).

Hereinafter, the conductive patterns CL that form the sensing electrodes SE1 and the driving electrodes SE2 of the touch sensing panel TSP, and an arrangement relationship of the conductive patterns CL, will be described with reference to FIGS. 6 to 12.

FIG. 6 is a plan view illustrating an embodiment of the touch sensing panel including the first sensing area and the second sensing area of FIG. 2.

Referring to FIG. 6, the touch sensing panel TSP may include a first sensing area TSA1 and a second sensing area TSA2. The touch sensing panel TSP may include conductive patterns CL. The conductive patterns CL may be disposed in the first sensing area TSA1 and the second sensing area TSA2. The first sensing area TSA1 may be an area overlapping an optical sensor (e.g., the optical sensor CM in FIG. 2). The second sensing area TSA2 may be an area distinct from the first sensing area TSA1. In an embodiment, the first sensing area TSA1 may be an area corresponding to a first area (e.g., the first area DA1 in FIG. 1) of an electronic device (e.g., the electronic device 100 in FIG. 1). The second sensing area TSA2 may be an area corresponding to the second area DA2 of the electronic device 10.

In an embodiment, as the conductive patterns CL are disposed in the first sensing area TSA1, it is possible to sense not only external input applied in the second sensing area TSA2, but also external input applied in the first sensing area TSA1.

In an embodiment, the conductive patterns CL may include first conductive patterns CL1 and second conductive patterns CL2. The first conductive patterns CL1 may extend in the first direction DR1 and be spaced apart from each other in the second direction DR2. The second conductive patterns CL2 may extend in the second direction DR2 and be spaced apart from each other in the first direction DR1. For example, the second conductive patterns CL2 may intersect with the first conductive patterns CL1.

In an embodiment, the first conductive patterns CL1 may include 1-1-th conductive patterns CL1_DA1 disposed in the first sensing area TSA1, and 1-2-th conductive patterns CL1_DA2 disposed in the second sensing area TSA2.

In an embodiment, the second conductive patterns CL2 may include 2-1-th conductive patterns CL2_DA1 disposed in the first sensing area TSA1, and 2-2-th conductive patterns CL2_DA2 disposed in the second sensing area TSA2.

In an embodiment, the first conductive patterns CL1 and the second conductive patterns CL2 that are disposed in the first sensing area TSA1 may intersect with each other, thus providing and/or forming first opening areas UA1. In an embodiment, the 1-1-th conductive patterns CL1_DA1 and the 2-1-th conductive patterns CL2_DA1 may intersect with each other, thus providing and/or forming the first opening areas UA1.

In an embodiment, the first conductive patterns CL1 and the second conductive patterns CL2 that are disposed in the second sensing area TSA2 may intersect with each other, thus providing and/or forming second opening areas UA2. In an embodiment, the 1-2-th conductive patterns CL1_DA2 and the 2-2-th conductive patterns CL2_DA2 may intersect with each other, thus providing the second opening areas UA2.

In an embodiment, the surface area of each of the first opening areas UA1 may be greater than the surface area of each of the second opening areas UA2. For example, the light transmittance of the first sensing area TSA1 may be higher than the light transmittance of the second sensing area TSA2.

Still referring to FIG. 6, the square surface area of one of the first opening areas UA1 may be about four times larger than that of one of the second opening areas UA2. However, the present disclosure is not limited to the aforementioned example, and the surface area of each of the first opening areas UA1 may be changed depending on the manufacturing process conditions of the display device.

In an embodiment, the first conductive electrodes CL1 may be arranged parallel to each other in the first direction DR1, and the second conductive electrodes CL2 may be arranged parallel to each other in the second direction DR2. Each of the first opening areas UA1 and the second opening areas UA2 may have a rectangular shape. However, the present disclosure is not limited to the aforementioned example. For example, in a case in which the first conductive patterns CL1 are not parallel to each other in the first direction DR1, or the second conductive patterns CL2 are not parallel to each other in the second direction DR2, the shape of each of the first opening areas UA1 and the second opening areas UA2 may include shapes with closed curves.

In an embodiment, a distance between adjacent conductive patterns CL disposed in the first sensing area TSA1 may be greater than a distance between adjacent conductive patterns CL disposed in the second sensing area TSA2.

In an embodiment, a first distance between the first conductive patterns CL1 disposed in the first sensing area TSA1 may be greater than a second distance between the first conductive patterns CL1 disposed in the second sensing area TSA2. The first distance may be a distance between the 1-1-th conductive patterns CL1_DA1. The second distance may be a distance between the 1-2-th conductive patterns CL1_DA2.

In an embodiment, a third distance between the second conductive patterns CL2 disposed in the first sensing area TSA1 may be greater than a fourth distance between the second conductive patterns CL2 disposed in the second sensing area TSA2. In an embodiment, the third distance may be a distance between the 2-1-th conductive patterns CL2_DA1, and the fourth distance may be a distance between the 2-2-th conductive patterns CL2_DA2.

In an embodiment, the 1-1-th conductive patterns CL1_DA1 may be connected to the 1-2-th conductive patterns CL1_DA2 on a boundary between the first sensing area TSA1 and the second sensing area TSA2. In an embodiment, the 2-1-th conductive patterns CL2_DA1 may be connected to the 2-2-th conductive patterns CL2_DA2 on the boundary between the first sensing area TSA1 and the second sensing area TSA2.

In an embodiment, thicknesses (in the first direction DR1 and the second direction DR2) of the first conductive patterns CL1 and the second conductive patterns CL2 may be substantially the same as each other.

In an embodiment, the thicknesses of the 1-1-th conductive patterns CL1_DA1 and the 1-2-th conductive patterns CL1_DA2 may be substantially the same as each other. The thicknesses of the 2-1-th conductive patterns CL2_DA1 and the 2-2-th conductive patterns CL2_DA2 may be substantially the same as each other.

In an embodiment, the 1-1-th conductive patterns CL1_DA1 and the 2-1-th conductive patterns CL2_DA1 that are disposed in the first sensing area TSA1 may provide and/or form a first mesh pattern. The first mesh pattern may include the first opening areas UA1.

In an embodiment, the 1-2-th conductive patterns CL1_DA2 and the 2-2-th conductive patterns CL2_DA2 that are disposed in the second sensing area TSA2 may provide and/or form a second mesh pattern. The second mesh pattern may include the second opening areas UA2.

In an embodiment, the density of the first mesh pattern may be less than the density of the second mesh pattern.

The display device in accordance with embodiments of the present disclosure may include the touch sensing panel TSP with the conductive patterns CL disposed in the first sensing area TSA1 overlapping the optical sensor, thus enabling touch detection not only in the second sensing area TSA2, but also in the first sensing area TSA1. For example, according to embodiments of the present disclosure, a display device with enhanced convenience may be provided.

Furthermore, the touch sensing panel TSP may provide lower density mesh patterns for the conductive patterns CL disposed in the first sensing area TSA1 compared to the second sensing area TSA2, thereby providing a display device with a reliable light transmitting area through which light can be incident on the optical sensor. As a result, the reliability of the display device can be secured.

Figure 7:
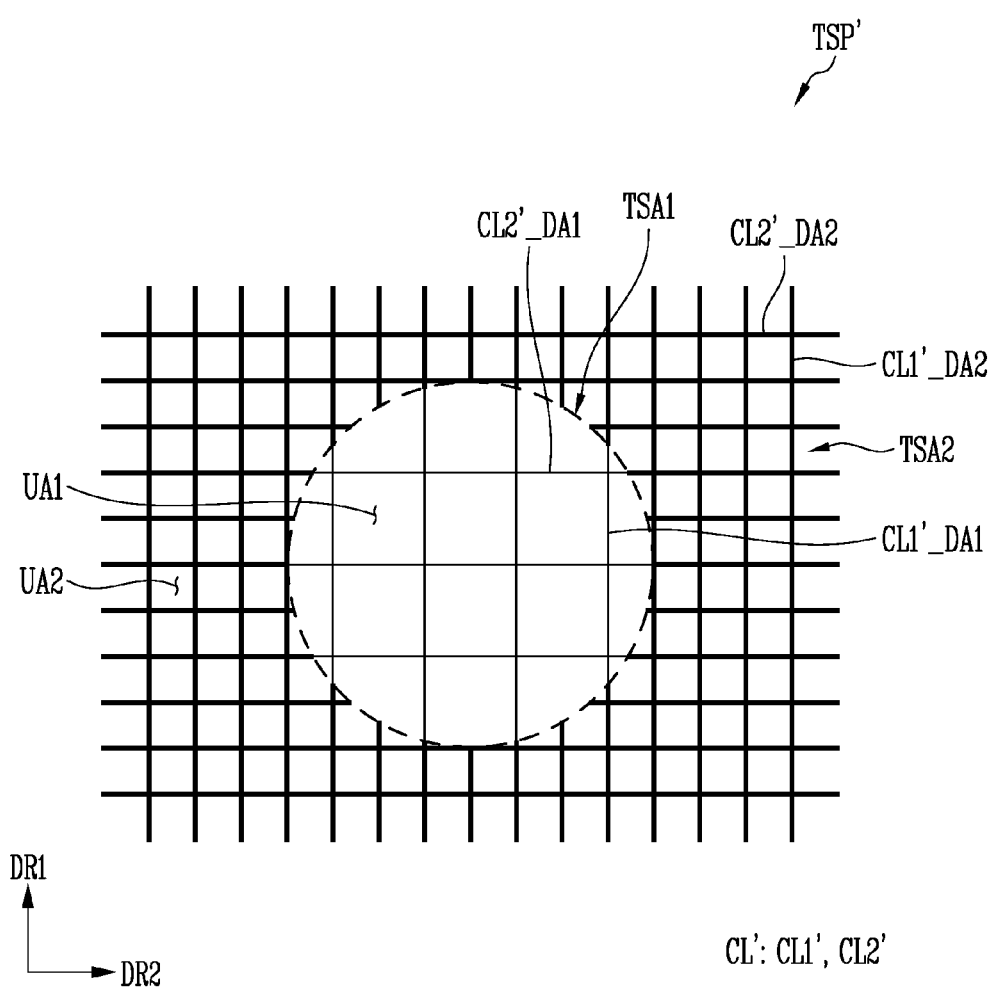
FIG. 7 is a plan view illustrating an embodiment of the touch sensing panel including the first sensing area and the second sensing area of FIG. 2.

FIG. 7 is a plan view illustrating an embodiment of the touch sensing panel including the first sensing area and the second sensing area of FIG. 2.

For convenience of explanation, a further description of components and technical features previously described will be omitted, and differences from embodiments described above (e.g., an embodiment according to FIG. 6) will be focused on.

Referring to FIG. 7, the remaining technical features, except for conductive patterns CL', may correspond to the technical features described with reference to FIG. 6.

Referring to FIG. 7, a touch sensing panel TSP' may include a first sensing area TSA1 and a second sensing area TSA2. The touch sensing panel TSP' may include conductive patterns CL'.

In an embodiment, the conductive patterns CL' may include first conductive patterns CL1' and second conductive patterns CL2'. The first conductive patterns CL1' may extend in the first direction DR1 and be spaced apart from each other in the second direction DR2. The second conductive patterns CL2' may extend in the second direction DR2 and be spaced apart from each other in the first direction DR1. For example, the second conductive patterns CL2' may intersect with the first conductive patterns CL1'.

In an embodiment, the first conductive patterns CL1' may include 1-1-th conductive patterns CL1'_DA1 disposed in the first sensing area TSA1, and 1-2-th conductive patterns CL1'_DA2 disposed in the second sensing area TSA2.

In an embodiment, the first conductive patterns CL2' may include 2-1-th conductive patterns CL2'_DA1 disposed in the first sensing area TSA1, and 2-2-th conductive patterns CL2'_DA2 disposed in the second sensing area TSA2.

In an embodiment, a thickness of the 1-1-th conductive patterns CL1'_DA1 may be substantially the same as a thickness of the 2-1-th conductive patterns CL2'_DA1. A thickness of the 1-2-th conductive patterns CL1'_DA2 may be substantially the same as a thickness of the 2-2-th conductive patterns CL2'_DA2.

In an embodiment, the thickness of the conductive patterns CL' disposed in the first sensing area TSA1 may be less than the thickness of the conductive patterns CL' disposed in the second sensing area TSA2. In an embodiment, the thickness of the 1-1-th conductive patterns CL1'_DA1 and the 2-1-th conductive patterns CL2'_DA1 may be less than the thickness of the 1-2-th conductive patterns CL1'_DA2 and the 2-2-th conductive patterns CL2'_DA2. For example, the thickness of the 1-1-th conductive patterns CL1'_DA1 and the 2-1-th conductive patterns CL2'_DA1 may be about 1.8 μm, and the thickness of the 1-2-th conductive patterns CL1'_DA2 and the 2-2-th conductive patterns CL2'_DA2 may be about 2.5 μm.

In an embodiment, since the thickness of the conductive patterns CL' disposed in the first sensing area TSA1 is less than the thickness of the conductive patterns CL' disposed in the second sensing area TSA2, a light transmitting area in the first sensing area TSA1 may be secured.

In an embodiment, the 1-1-th conductive patterns CL1_DA1 and the 2-1-th conductive patterns CL2'_DA1 disposed in the first sensing area TSA1 may be formed with a thickness different from the 1-2-th conductive patterns CL1'_DA2 and the 2-2-th conductive patterns CL2'_DA2 disposed in the second sensing area TSA2, through, for example, a sputtering process in which the conductive patterns are directly deposited. In an embodiment, the conductive patterns CL' disposed in the first and second sensing areas TSA1 and TSA2 may be formed with different thicknesses and/or widths through methods such as, for example, dry etching or wet etching performed on front-deposited conductive material.

Figure 8:
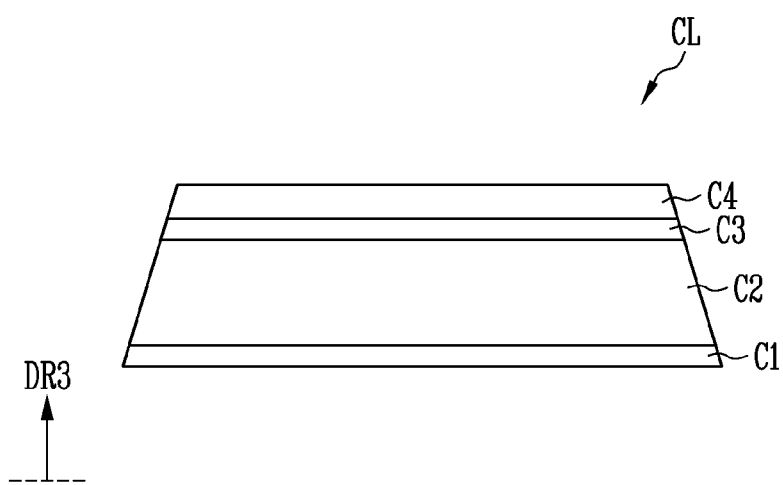
FIG. 8 is a cross-sectional view illustrating an embodiment of conductive patterns of the touch sensing panel of FIG. 4.

FIG. 8 is a cross-sectional view illustrating an embodiment of the conductive patterns CL of the touch sensing panel of FIG. 4.

Referring to FIG. 8, the conductive pattern CL may include at least one or more conductive layers C1 to C3, and a low-reflective layer C4 disposed on the at least one or more conductive layers C1 to C3. In an embodiment, the low-reflective layer C4 may be omitted.

In an embodiment, the at least one or more conductive layers C1 to C3 and the low-reflective layer C4 may be successively stacked in the third direction DR3.

In an embodiment, the at least one or more conductive layers C1 to C3 may include a first conductive layer C1, a second conductive layer C2, and a third conductive layer C3. The at least one or more conductive layers C1 to C3 may include a metallic material. For example, the first conductive layer C1 and the third conductive layer C3 may include titanium (Ti), and the second conductive layer C2 may include aluminum (Al). In an embodiment, the first conductive layer C1 and the third conductive layer C3 may be omitted. In this case, the low-reflective layer C4 may be disposed on the second conductive layer C2.

In an embodiment, the low-reflective layer C4 may include a metallic compound. In an embodiment, the low-reflective layer C4 may include at least one of, for example, molybdenum titanium oxide ($MoTiO_x$) and molybdenum tantalum oxide ($MoTaO_x$). In an embodiment, in a case in which the low reflective layer C4 includes molybdenum titanium oxide ($MoTiO_x$), the composition ratio of titanium (Ti) may be about 12 at % or more. However, the present disclosure is not limited to the aforementioned example. For example, the composition ratio of the titanium may be set within a range that can lower specific resistance of the conductive patterns CL and reduce solubility.

Figure 9:
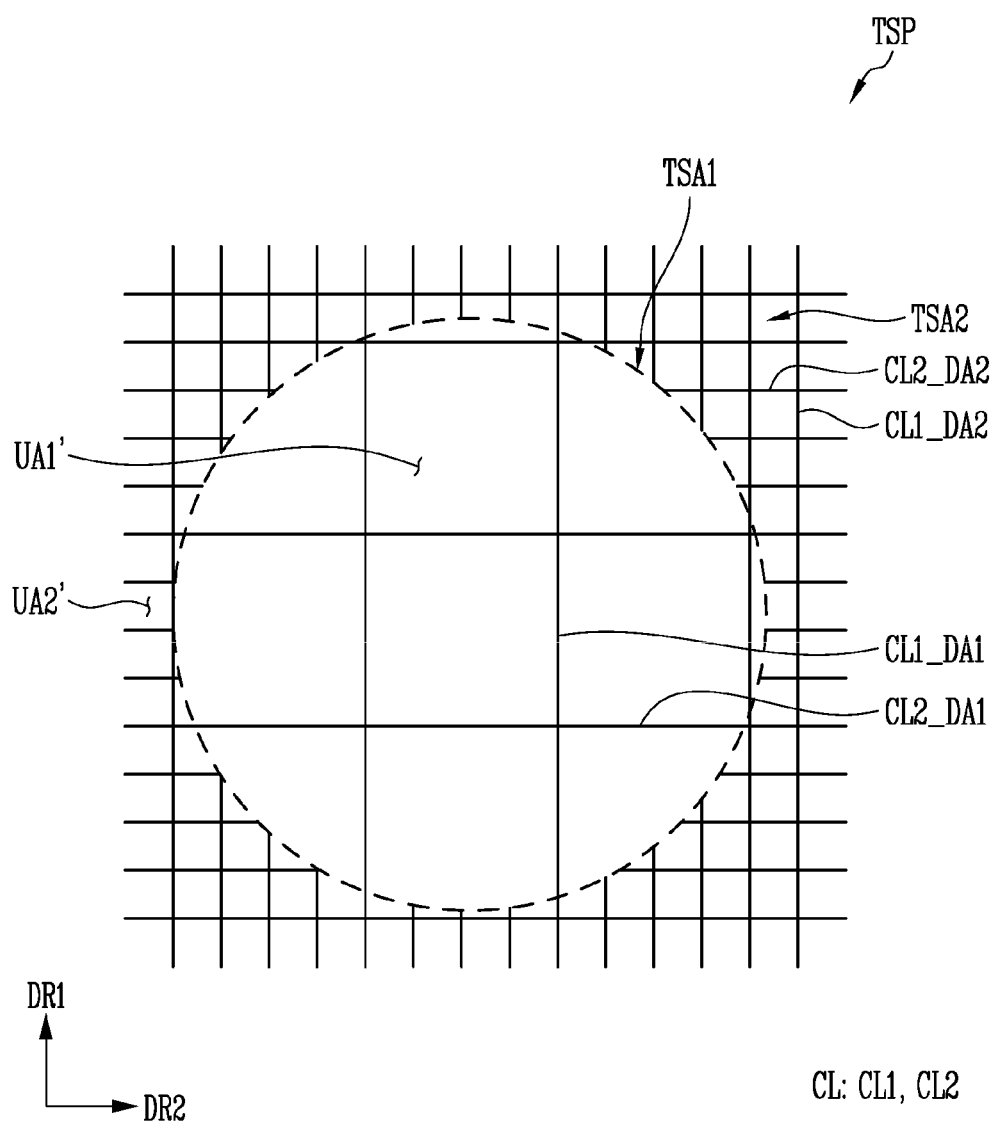
FIGS. 9 and 10 are plan views illustrating embodiments of the touch sensing panel including conductive patterns parallel to each other.
Figure 10:
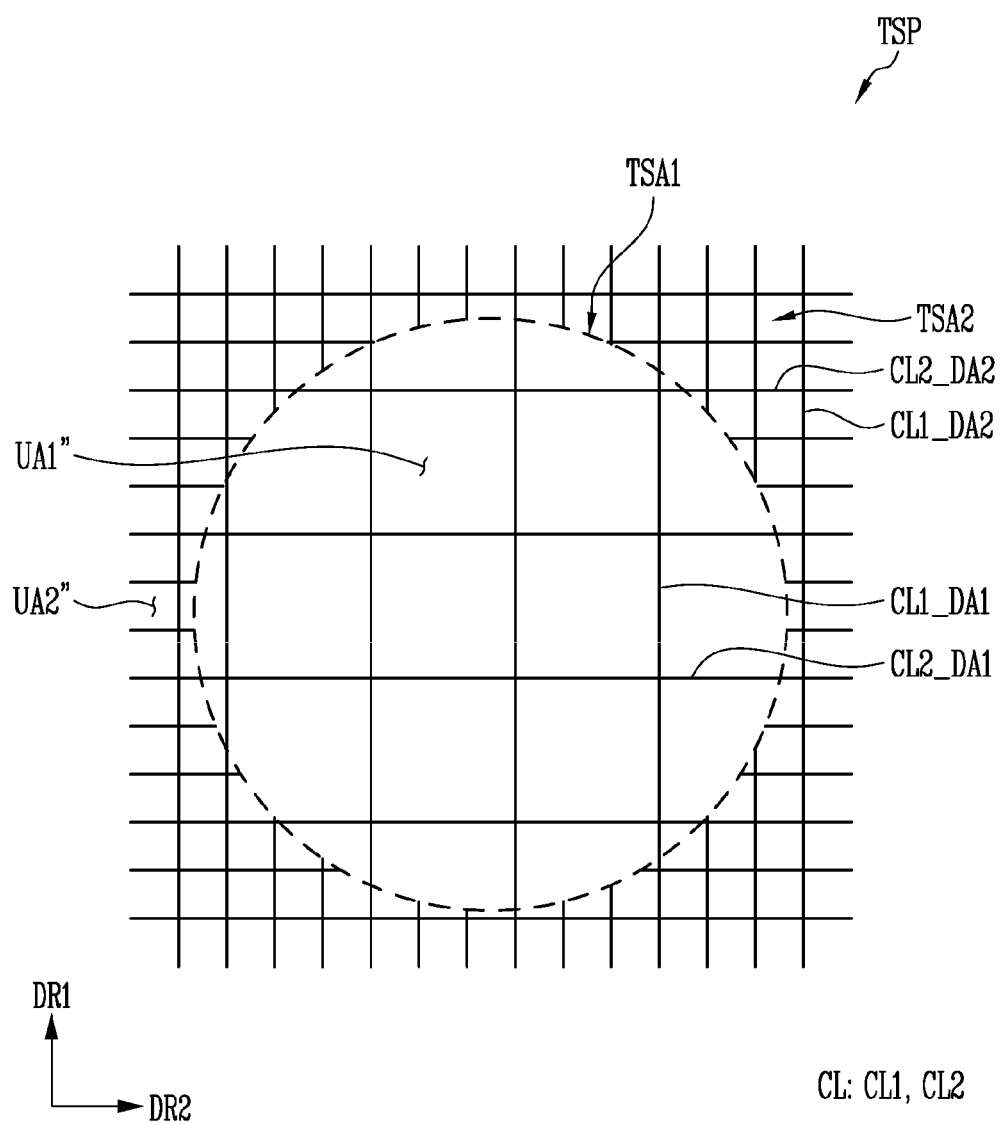

FIGS. 9 and 10 are plan views illustrating embodiments of the touch sensing panel including conductive patterns parallel to each other.

Hereinafter, the control of the size of the light transmitting area in the first sensing area TSA1 will be described with reference to FIGS. 9 and 10.

Referring to FIGS. 9 and 10, general configurations other than first opening areas UA1' and UA1" and second opening areas UA2' and UA2" may correspond to or be the same as the configurations described above with reference to FIG. 6.

In an embodiment, the first conductive electrodes CL1 may be arranged parallel to each other in the first direction DR1. The second conductive electrodes CL2 may be arranged parallel to each other in the second direction DR2.

In an embodiment, the first conductive patterns CL1 and the second conductive patterns CL2 that are disposed in the first sensing area TSA1 may intersect with each other, thus providing and/or forming first opening areas UA1' and UA1". In an embodiment, the 1-1-th conductive patterns CL1_DA1 and the 2-1-th conductive patterns CL2_DA1 may intersect with each other, thus providing and/or forming the first opening areas UA1' and UA1".

In an embodiment, the first conductive patterns CL1 and the second conductive patterns CL2 that are disposed in the second sensing area TSA2 may intersect with each other, thus providing and/or forming second opening areas UA2' and UA2". In an embodiment, the 1-2-th conductive patterns CL1_DA2 and the 2-2-th conductive patterns CL2_DA2 may intersect with each other, thus providing the second opening areas UA2' and UA2".

In an embodiment, the surface area of each of the first opening areas UA1' and UA1" may be greater than the surface area of each of the second opening areas UA2' and UA2". For example, the light transmittance of the first sensing area TSA1 may be higher than the light transmittance of the second sensing area TSA2.

Referring to FIG. 9, two 1-1-th conductive patterns CL1_DA1 and two 2-1-th conductive patterns CL2_DA1 may be disposed in the first sensing area TSA1. In an embodiment, five 1-2-th conductive patterns CL1_DA2 may be disposed in a width between the 1-1-th conductive patterns CL1_DA1. Five 2-2-th conductive patterns CL2_DA2 may be disposed in a width between the 2-1-th conductive patterns CL2_DA1. The square surface area of one of the first opening areas UA1' may be about sixteen times larger than that of one of the second opening areas UA2'.

Referring to FIG. 10, two 1-1-th conductive patterns CL1_DA1 and three 2-1-th conductive patterns CL2_DA1 may be disposed in the first sensing area TSA1. In an embodiment, four 1-2-th conductive patterns CL1_DA2 may be disposed in a width between the 1-1-th conductive patterns CL1_DA1. Four 2-2-th conductive patterns CL2_DA2 may be disposed in a width between the 2-1-th conductive patterns CL2_DA1. The square surface area of one of the first opening areas UA1' may be about nine times larger than that of one of the second opening areas UA2'.

Referring to FIGS. 9 and 10, in a case in which the surface area of the first sensing area TSA1 is the same, the light transmittance of the first sensing area TSA1 having the first opening areas UA1' may be higher than the light transmittance of the first sensing area TSA1 having the first opening areas UA1".

Figure 11:
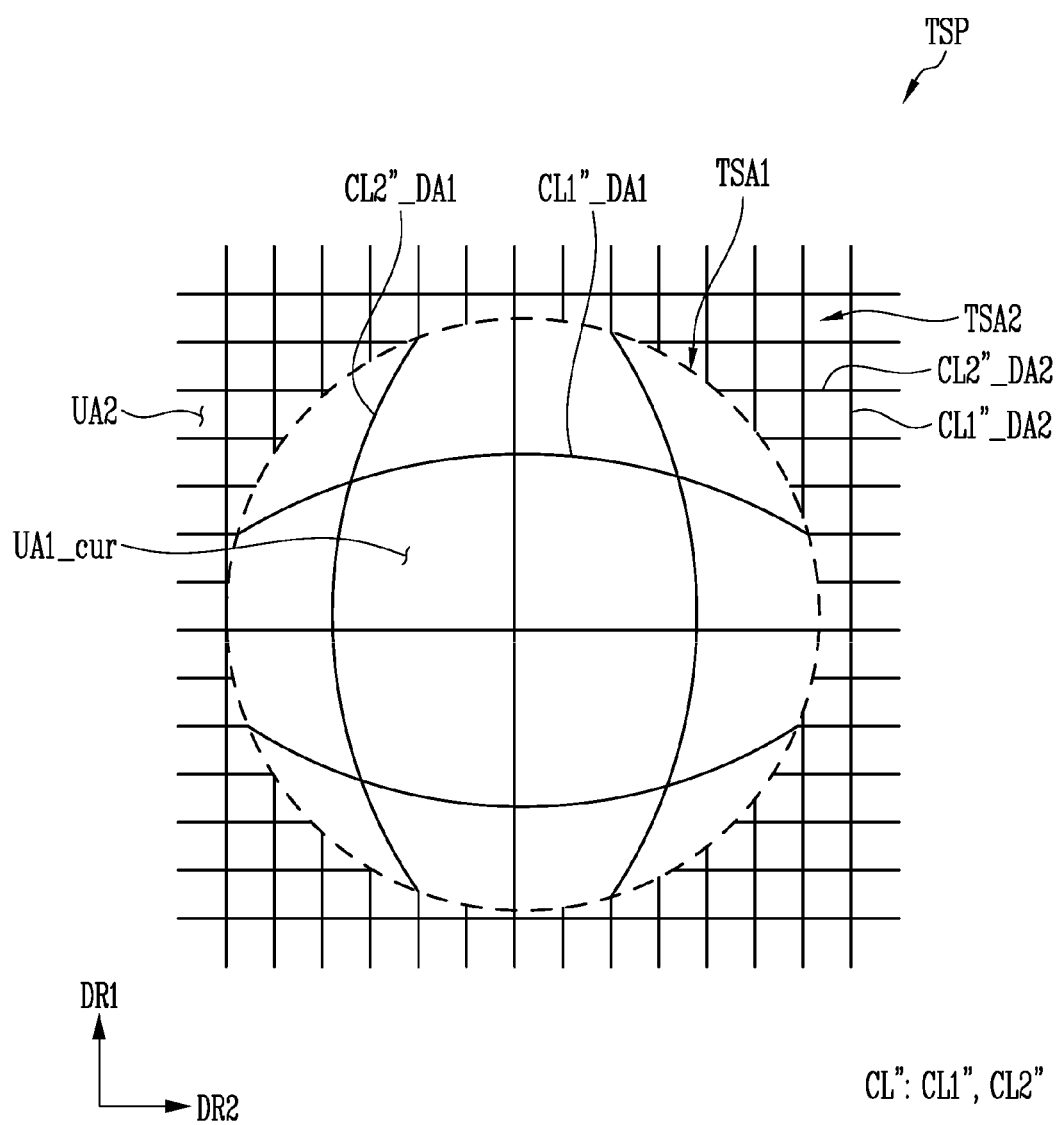
FIGS. 11 and 12 are plan views illustrating embodiments of the touch sensing panel including conductive patterns that are not parallel to each other.
Figure 12:
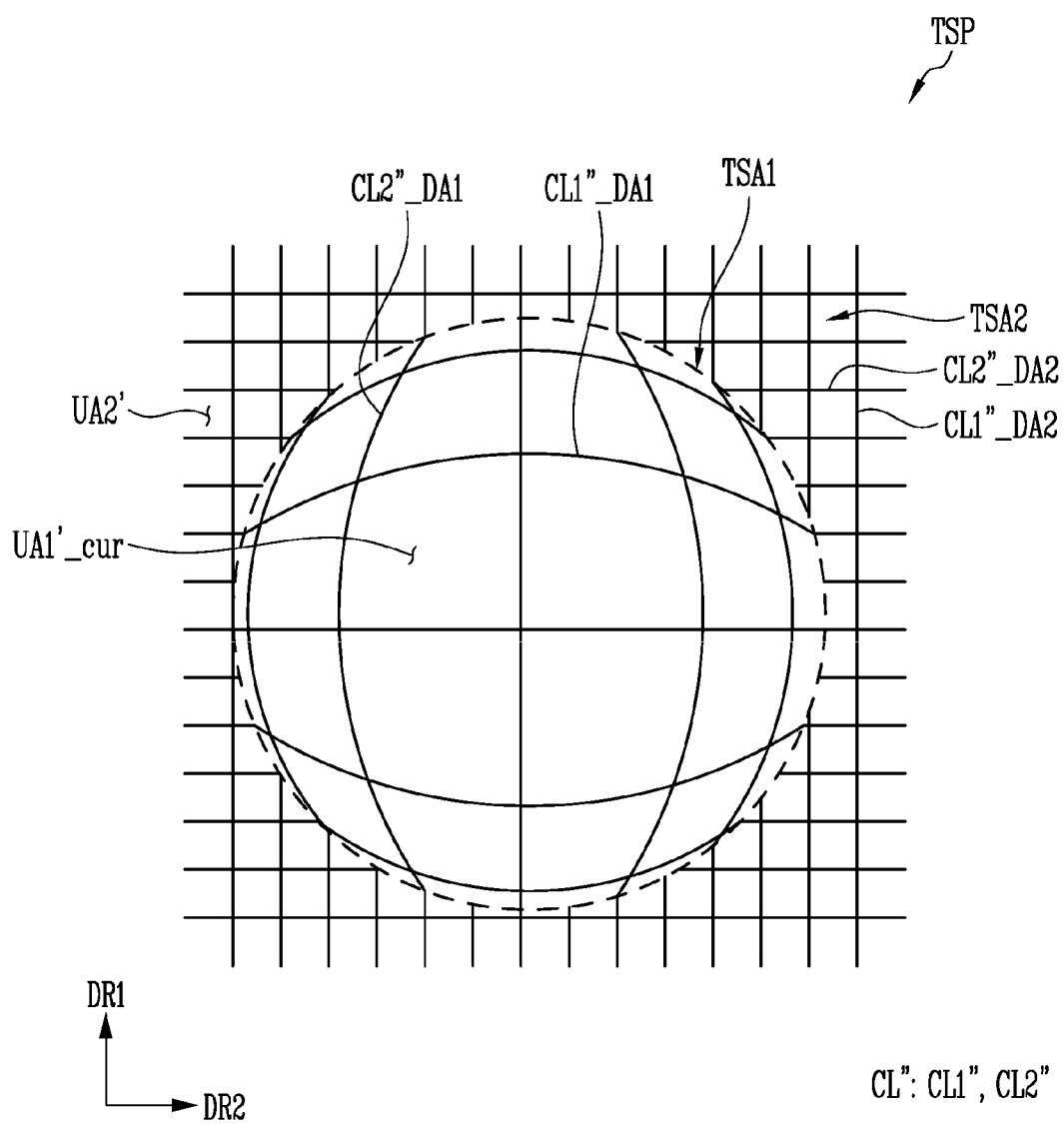

FIGS. 11 and 12 are plan views illustrating embodiments of the touch sensing panel including conductive patterns that are not parallel to each other.

Referring to FIGS. 11 and 12, the touch sensing panel TSP may include a first sensing area TSA1 and a second sensing area TSA2. The touch sensing panel TSP may include conductive patterns CL". The conductive patterns CL" may be disposed in the first sensing area TSA1 and the second sensing area TSA2. The first sensing area TSA1 may be an area overlapping an optical sensor (e.g., the optical sensor CM in FIG. 2). The second sensing area TSA2 may be an area distinct from the first sensing area TSA1. In an embodiment, the first sensing area TSA1 may be an area corresponding to a first area (e.g., the first area DA1 in FIG. 1) of an electronic device (e.g., the electronic device 100 in FIG. 1). The second sensing area TSA2 may be an area corresponding to the second area DA2 of the electronic device 100.

In an embodiment, the conductive patterns CL" may include first conductive patterns CL1" and second conductive patterns CL2". The first conductive patterns CL1" may extend in the first direction DR1 and be spaced apart from each other in the second direction DR2. The second conductive patterns CL2" may extend in the second direction DR2 and be spaced apart from each other in the first direction DR1. For example, the second conductive patterns CL2" may intersect with the first conductive patterns CL1".

In an embodiment, the first conductive patterns CL1" may include 1-1-th conductive patterns CL1"_DA1 disposed in the first sensing area TSA1, and 1-2-th conductive patterns CL1"_DA2 disposed in the second sensing area TSA2.

In an embodiment, the second conductive patterns CL2 may include 2-1-th conductive patterns CL2"_DA1 disposed in the first sensing area TSA1, and 2-2-th conductive patterns CL2"_DA2 disposed in the second sensing area TSA2.

In an embodiment, the 1-1-th conductive electrodes CL1"_DA1 are not parallel to each other in the first direction DR1, and the 2-1-th conductive electrodes CL2"_DA1 are not parallel to each other in the second direction DR2. In an embodiment, to secure the light transmitting area in the first sensing area TSA1, the 1-1-th conductive patterns CL1"_DA1 may have an intercepted arc shape extending in the first direction DR1. The 2-1-th conductive electrodes CL2"_DA1 may have an intercepted arc shape extending in the second direction DR2.

In an embodiment, the 1-1-th conductive patterns CL1"_DA1 and the 2-1-th conductive patterns CL2"_DA1 that are disposed in the first sensing area TSA1 may intersect with each other, thus providing and/or forming first curved opening areas UA1_cur and UA1'_cur.

In an embodiment, the number of 1-1-th conductive patterns CL1"_DA1 may be the same as the number of 2-1-th conductive patterns CL2"_DA1.

In an embodiment, the first curved opening areas UA1_cur and UA1' cur may be symmetric in the first direction DR1 and the second direction DR2 in the first sensing areas TSA1.

Referring to FIG. 11, two 1-1-th conductive patterns CL1" DA1 and two 2-1-th conductive patterns CL2"_DA1 may be disposed in the first sensing area TSA1.

Referring to FIG. 12, four 1-1-th conductive patterns CL1"_DA1 and four 2-1-th conductive patterns CL2"_DA1 may be disposed in the first sensing area TSA1.

Referring to FIGS. 11 and 12, in a case in which the surface area of the first sensing area TSA1 is the same, the light transmittance of the first sensing area TSA1 having the first curved opening areas UA1_cur may be higher than the light transmittance of the first sensing area TSA1 having the first curved opening areas UA1'_cur.

The display device in accordance with embodiments of the present disclosure may include the touch sensing panel TSP with the conductive patterns CL" disposed in the first sensing area TSA1 overlapping the optical sensor, thus enabling touch detection not only in the second sensing area TSA2, but also in the first sensing area TSA1. For example, according to embodiments of the present disclosure, a display device with enhanced convenience may be provided.

Furthermore, the touch sensing panel TSP may provide lower density mesh patterns for the conductive patterns CL" disposed in the first sensing area TSA1 compared to the second sensing area TSA2, thereby providing a display device with a reliable light transmitting area through which light can be incident on the optical sensor. Asd a result, the reliability of the display device can be secured.

A display device in accordance with embodiments of the present disclosure may include a touch sensing panel capable of detecting a touch not only in an area that does not overlap an optical sensor, but also in an area that overlaps the optical sensor, thus enhancing convenience.

Furthermore, the touch sensing panel may have a mesh pattern with a lower density in the area overlapping the optical sensor than in the area that does not overlap the optical sensor, thereby providing a display device with a reliable light transmitting area through which light can be incident on the optical sensor. As a result, the reliability of the display device can be secured.

While the present disclosure has been particularly shown and described with reference to embodiments thereof, it will be understood by those of ordinary skill in the art that various changes in form and detail may be made therein without departing from the spirit and scope of the present invention as defined by the following claims.

What is claimed is:

1. A display device, comprising:
an optical sensor;
a display panel disposed on the optical sensor; and
a touch sensing panel disposed on the display panel, and including a first sensing area corresponding to an area in which the optical sensor is disposed, and a second sensing area distinct from the first sensing area,
wherein the touch sensing panel comprises:
a plurality of first conductive patterns disposed in the first and second sensing areas and extending in a first direction; and
a plurality of second conductive patterns disposed in the first and second sensing areas and extending in a second direction intersecting with the first direction,
wherein first opening areas are provided by the first conductive patterns and the second conductive patterns that are disposed in the first sensing area,
wherein second opening areas are provided by the first conductive patterns and the second conductive patterns that are disposed in the second sensing area, and
wherein a surface area of each of the first opening areas is greater than a surface area of each of the second opening areas, and each of the first opening areas has a same shape as each of the second opening areas.

2. The display device according to claim 1,
wherein the first conductive patterns are parallel to each other in the first direction, and
wherein the second conductive patterns are parallel to each other in the second direction.

3. The display device according to claim 1,
wherein the first conductive patterns comprise 1-1-th conductive patterns disposed in the first sensing area, and 1-2-th conductive patterns disposed in the second sensing area,
wherein the second conductive patterns comprise 2-1-th conductive patterns disposed in the first sensing area, and 2-2-th conductive patterns disposed in the second sensing area,
wherein the first opening areas are provided in a first area where the 1-1-th conductive patterns and the 2-1-th conductive patterns intersect with each other, and
wherein the second opening areas are provided in a second area where the 1-2-th conductive patterns and the 2-2-th conductive patterns intersect with each other.

4. The display device according to claim 3,
wherein the 1-1-th conductive patterns and the 2-1-th conductive patterns are not parallel to each other, and
wherein the 1-2-th conductive patterns and the 2-2-th conductive patterns are not parallel to each other.

5. The display device according to claim 4, wherein a number of the 1-1-th conductive patterns is identical to a number of the 2-1-th conductive patterns.

6. The display device according to claim 3, wherein thicknesses of the 1-1-th conductive patterns and the 2-1-th conductive patterns are less than thicknesses of the 1-2-th conductive patterns and the 2-2-th conductive patterns.

7. The display device according to claim 1, wherein the first conductive patterns and the second conductive patterns include at least one or more conductive layers and a low-reflective layer that are stacked in a third direction.

8. The display device according to claim 7,
wherein the low-reflective layer includes molybdenum-titanium oxide ($MoTiO_x$), and
wherein a composition ratio of titanium (Ti) in the molybdenum-titanium oxide is about 12 at % or more.

9. The display device according to claim 8,
wherein the at least one or more conductive layers comprise a first conductive layer, a second conductive layer, and a third conductive layer that are stacked in the third direction,
wherein the first conductive layer and the third conductive layer include titanium (Ti), and wherein the second conductive layer includes aluminum (Al).

10. The display device according to claim 1,
wherein a first mesh pattern having the first opening areas is formed in the first sensing area,
wherein a second mesh pattern having the second opening areas is formed in the second sensing area, and
wherein a density of the first mesh pattern is less than a density of the second mesh pattern.

11. The display device according to claim 1,
wherein the display panel comprises a base substrate, a pixel circuit layer, a display element layer, and an encapsulation layer that are successively disposed in a third direction,
wherein the touch sensing panel comprises a first insulating layer and a second insulating layer that are disposed on the encapsulation layer,
wherein the touch sensing panel further comprises first contact electrodes connected to the first conductive patterns, and second contact electrodes connected to the second conductive patterns, the first and the second contact electrodes being disposed on the first insulating layer, and
wherein the first conductive patterns and the second conductive patterns are disposed on the second insulating layer.

12. A display device, comprising:
an optical sensor;
a display panel disposed on the optical sensor; and
a touch sensing panel disposed on the display panel, and including a first sensing area corresponding to an area in which the optical sensor is disposed, and a second sensing area distinct from the first sensing area,
wherein the touch sensing panel comprises a plurality of conductive patterns disposed in the first sensing area and the second sensing area, and
wherein a first distance between the conductive patterns adjacent to each other in the first sensing area is greater than a second distance between the conductive patterns adjacent to each other in the second sensing area,
wherein the conductive patterns comprise:
a plurality of first conductive patterns disposed in the first and second sensing areas and extending in the first direction; and
a plurality of second conductive patterns disposed in the first and second sensing areas and extending in the second direction,
wherein a third distance between the first conductive patterns disposed in the first sensing area is greater than a fourth distance between the first conductive patterns disposed in the second sensing area.

13. The display device according to claim 12, wherein a first thickness of the conductive patterns disposed in the first sensing area is less than a second thickness of the conductive patterns disposed in the second sensing area.

14. The display device according to claim 13,
wherein the first thickness is about 1.8 μm, and
wherein the second thickness is about 2.5 μm.

15. The display device according to claim 12, wherein a fifth distance between the second conductive patterns disposed in the first sensing area is greater than a sixth distance between the second conductive patterns disposed in the second sensing area.

16. The display device according to claim 12,
wherein a first mesh pattern having first opening areas is formed by the first conductive patterns and the second conductive patterns in the first sensing area,
wherein a second mesh pattern having second opening areas is formed by the first conductive patterns and the second conductive patterns in the second sensing area, and
wherein a density of the first mesh pattern is less than a density of the second mesh pattern.

17. The display device according to claim 12, wherein the conductive patterns comprise at least one or more conductive layers and a low-reflective layer that are stacked in a third direction.

18. The display device according to claim 17,
wherein the low-reflective layer includes molybdenum-titanium oxide ($MoTiO_x$), and
wherein a composition ratio of titanium (Ti) in the molybdenum-titanium oxide is about 12 at % or more.

* * * * *